(12) United States Patent
Shikayama et al.

(10) Patent No.: US 6,731,029 B2
(45) Date of Patent: May 4, 2004

(54) CANNED LINEAR MOTOR

(75) Inventors: Toru Shikayama, Kitakyushu (JP);
Shusaku Yoshida, Kitakyushu (JP);
Nobuyuki Irie, Kitakyushu (JP);
JianPing Yu, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 26 days.

(21) Appl. No.: 10/203,651

(22) PCT Filed: Feb. 23, 2001

(86) PCT No.: PCT/JP01/01391
§ 371 (c)(1),
(2), (4) Date: Aug. 26, 2002

(87) PCT Pub. No.: WO01/63733
PCT Pub. Date: Aug. 30, 2001

(65) Prior Publication Data
US 2003/0020340 A1 Jan. 30, 2003

(30) Foreign Application Priority Data
Feb. 25, 2000 (JP) .......................................... 2000-49726

(51) Int. Cl.⁷ .................................................. H02K 9/00
(52) U.S. Cl. .......................................... 310/58; 310/12
(58) Field of Search ............................... 310/58, 12, 13, 310/16, 52, 53, 54, 64

(56) References Cited

U.S. PATENT DOCUMENTS

| | | | |
|---|---|---|---|
| 5,770,899 A | * 6/1998 | Hayashi | 310/12 |
| 5,998,889 A | * 12/1999 | Novak | 310/12 |
| 6,140,734 A | * 10/2000 | Hazelton et al. | 310/198 |
| 6,160,327 A | * 12/2000 | Wang | 310/12 |
| 6,469,406 B1 | * 10/2002 | Hwang et al. | 310/12 |
| 6,472,779 B2 | * 10/2002 | Hwang et al. | 310/12 |

FOREIGN PATENT DOCUMENTS

| | | |
|---|---|---|
| JP | 55-153269 | 11/1980 |
| JP | 1-190250 | 7/1989 |
| JP | 5-234749 | 9/1993 |
| JP | 6-69551 | 3/1994 |
| JP | 6-275873 | 9/1994 |
| JP | 10-512437 | 11/1998 |
| JP | 11-206099 | 7/1999 |

* cited by examiner

Primary Examiner—Thanh Lam
(74) Attorney, Agent, or Firm—Westerman, Hattori, Daniels & Adrian, LLP

(57) ABSTRACT

A canned linear motor such that increase of the temperature of the mover is suppressed, the viscous damping force is reduced, and the strength of the can does not deteriorate. A canned linear motor comprises two parts, in one of which a permanent magnet is provided as a field system and in the other of which a three-phase armature winding, a winding fixing frame for supporting the armature winding, a coolant passage through which a coolant for cooling the surface of the armature winding passes, a can (14) covering the armature winding and the coolant passage, and a header (14') for sealing the can. Slits (151, 152) extending in the direction of travel and parallel to each other are formed in the can (14).

8 Claims, 12 Drawing Sheets

(a)

(b)

CANNED LINEAR MOTOR

TECHNICAL FIELD

The invention relates to a linear motor, and in particular a canned linear motor, used for, for example, feeding in electronic component inspection apparatuses and machine tools, etc., in which an increase in temperature is suppressed and constant-rate feeding accuracy is required.

PRIOR ARTS

In a canned linear motor provided with three-phase armature winding at its stator and a permanent magnet, used as a field system, at its mover, the armature winding is directly cooled by a coolant, wherein an increase in the surface temperature of the linear motor can be suppressed to be low.

However, according to the conventional art, since there is completely no problem if a structure in which a mover and a stator are replaced with each other is employed, such a type in which the mover is provided with armature winding has been frequently used in applications where the stroke is long.

Herein, a description will be given mainly of a canned linear motor in which an armature winding formed of a plurality of coil groups is made into a mover, and a plurality of permanent magnets of which used field systems, which have different polarities from each other are juxtaposed adjacent to a stator. However, the canned linear motor is not limited to this specification.

FIG. 8 is a perspective view showing the entirety of a linear motor in a conventional art. In FIG. 8, reference number 80 denotes a mover, reference number 81 denotes a mover base, reference number 84 denotes a can, reference number 31 denotes a coolant discharge port, reference number 32 denotes a coolant supply port, reference number 33 denotes a cable, reference number 90 denotes a stator, reference number 91 denotes a stator base, reference number 92 denotes a field system yoke, and reference number 93 denotes a permanent magnet.

The mover 80 is formed to be T-shaped as described later, wherein its longitudinal member (armature) is supported by a linear guide, an air slider, and a slider guide, etc., between the permanent magnets 93 disposed between the field system yokes 92 and 92 of the stator 90, and by causing an appointed current to flow into the armature winding, the longitudinal member operates with a magnetic field produced by the permanent magnets 93 to generate a thrust in the mover 80, by which the motor 80 is movable in the directions of travel shown by the arrows.

FIG. 1(b) is a cross-sectional view of a conventional art linear motor of FIG. 8 when observing the same from the front side thereof. In the drawing, the mover 80 is formed to be T-shaped. The mover 80 is composed of a mover base 81, a can 84 supported in a depression of the mover base 81 downward, a header 84' (See FIG. 5) to seal the can 84, a winding fixing frame 82 disposed in a gap produced by the can 84 and the header 84', a coreless type three-phase armature winding 83, which is fixed at the winding fixing frame 82, and a coolant passage 87 passing through the can 84.

FIG. 5(a) shows a side elevational view of the mover, and FIG. 6 shows a view of arranging an armature winding when being observed from the mover side. Herein, as shown in FIG. 6, the armature winding 83 is formed of three phases and is thin plate-shaped. By adhering the same to both the right and left sides of the winding fixed frame 82, the entirety of the armature winding is constructed, and the strength thereof is improved. Also, since the winding fixing frame 82 itself needs strength, the winding fixing frame 82 is frequently made of stainless steel.

The can 84 is rectangular-tubular, for which a stainless steel thin plate is bent to be channel-shaped and welded together. Two headers 84' (FIG. 5) made of stainless steel casting are provided with a coolant supply port 32 and a coolant discharge port 31, through which a coolant is permitted to pass. The can 84 and headers 84' are welded together at the conjunction plane.

Also, by causing a coolant to be supplied through the coolant supply port 32 and to be discharged through the coolant discharge port 31, the coolant flows through a coolant passage 87 (FIG. 1(b)) located between the armature winding 83 and the can 84.

On the other hand, as shown in FIG. 1(b), the stator 90 is recess-shaped so that it can wrap the armature portion of the mover 80. The stator 90 is composed of a permanent magnet 93 disposed at both sides of the can 84 and header 84' of the mover 80 with a gap, a field system yoke 92 made of a magnetic body that causes a magnetic flux produced by the permanent magnet 93 to pass through, and a stator base 91 to support the same. Also, a plurality of permanent magnets 93 juxtaposed in the direction of travel are disposed so that the same have a different polarity from each other at each polarity pitch λ (FIG. 8).

The canned linear motor thus constructed operates with a magnetic field produced by the permanent magnet of the stator by causing an appointed current appropriate to a position of the mover to flow into the armature winding, wherein a thrust is generated at the mover, and the armature winding heated due to a copper loss is cooled by the coolant, and a temperature rise at the surface of the mover can be suppressed to be low.

However, in the conventional art, there are the following problems.

The can 84, winding fixing frame 82, header 84', etc., are made of stainless steel as described above. The members made of stainless steel materials generate an eddy current ie at each polarity pitch λ by passing between the permanent magnets 93 of the stator 90. FIG. 5(b) shows a view of an occurrence of the eddy current ie. As has been made clear in FIG. 5(b), the eddy current ie of the conventional art device flows, depicting a large loop, so that the flow passage extends entirely in the vertical direction of the can 84 and header 84'. And, a viscous damping force is generated by vertical direction constituents of the eddy current ie. The viscous damping force crosses the magnetic flux produced by the eddy current ie and permanent magnet 93 and is generated in a reverse direction of the direction of travel of the mover 80. The intensity thereof is almost proportionate to the thickness and width of stainless steel, travel speed of the mover 80, number of points where the eddy current ie occurs, and square of the magnetic flux density. The following problems further occur due to generation of such a viscous damping force.

(1) Where a certain thrust is attempted to be gained, the thrust is decreased equivalent to the size of the viscous damping force even if an appointed armature current is caused to flow, wherein it becomes necessary to cause a greater armature current to flow than is usually necessary. Resultantly, the copper loss of the armature winding is increased, temperature of the can and the surface of the header is accordingly increased.

(2) The eddy current is converted to heat as a so-called eddy current loss at a point where an eddy current is generated. That is, the can, winding fixing frame and header where the eddy current is generated are heated, resulting in a further rise in temperature. In applications where the temperature is remarkably limited, there may be a case where no expected specification can be satisfied by the heating.

(3) Recently, a viscous damping force has tended to be further increased in line with a request for increasing the speed, and further the viscous damping force is generated in a reverse direction of the travel direction of the mover, wherein the speed of a linear motor is subjected to fluctuations due to fluctuations of the viscous damping force. Since influences of the viscous damping force onto fluctuations in the speed of the linear motor are comparatively slight in comparison with a thrust generated, the influences are not highly emphasized. However, in recent years, requests to decrease fluctuations in the speed have increased in line with recent needs for high accuracy and high density in various types of precious machines and apparatuses, etc. Therefore, it has been required that, without changing the materials of components, fluctuations in the speed of a linear motor are suppressed and decreased while suppressing the fluctuations in the viscous damping force with mechanical strength maintained.

The invention was developed in order to solve these and other problems, and it is therefore an object of the invention to provide a canned linear motor that is capable of suppressing a rise in the temperature of the mover, decreasing the viscous damping force, and suppressing the ratio of fluctuations, and in which the strength of the can does not deteriorate.

DISCLOSURE OF THE INVENTION

In order to solve the above-described problems, a canned linear motor according to the first aspect of the invention is featured in that the canned linear motor includes field system yokes, having different polarities from each other, in which a plurality of permanent magnets are juxtaposed adjacent to each other; an armature disposed so as to be opposed to the above-described permanent magnet row with a magnetic gap secured therebetween and having an armature winding; in which the above-described armature is provided with a winding fixing frame having the above-described armature winding mounted on both sides thereof along the lengthwise direction of the above-described armature; a can that accommodates the above-described armature winding and the above-described winding fixing frame and has a coolant passage for causing a coolant to flow to the periphery of both the members; and a header having a coolant supply port attached at one of both ends of the above-described can and having a coolant discharge port attached at the other end thereof; and in which any one of the above-described field system yokes and the above-described armature is made into a stator, and the other of which is made into a mover, and the above-described field system yokes and the above-described armature are caused to run relative to each other; wherein a plurality of slits are provided in the above-described can, a leak preventing sheet is adhered to the inside of the above-described can so as to cover the above-described slits; and at the same time, resin is filled in the above-described slits.

Further, a canned linear motor according to the second aspect of the invention is featured in that, in addition to the canned linear motor described in the first aspect of the invention, the above-described plurality of slits extend in the direction of travel in parallel to each other.

Also, a canned linear motor according to the third aspect of the invention is featured in that, in addition to the canned linear motor described in the first aspect of the invention, the above-described plurality of slits are split in parallel to each other and in the direction of travel.

In addition, a canned linear motor according to the fourth aspect of the invention is featured in that, in addition to the canned linear motor described in the first or third aspect of the invention, the above-described plurality of slits are disposed one by one every $3 \times \lambda$ ($\lambda$=polarity pitch).

Also, a canned linear motor according to the fifth aspect of the invention is featured in that, in addition to the canned linear motor described in the first, third or fourth aspect of the invention, the above-described plurality of slits are split in parallel to each other and in the direction of travel, and a deviation of $1.5 \times \lambda$ ($\lambda$=polarity pitch) is provided between the above-described slits and adjacent slits in the direction orthogonal to the direction of travel.

Further, a canned linear motor according to the sixth aspect of the invention is featured in that, in addition to the canned linear motor described in any one of the first through the fifth aspects of the invention, the above-described header is provided with a plurality of slits extending in parallel to each other in the travel direction, and a leak preventing sheet is adhered to the inside of the above-described header so as to cover the above-described slits, and at the same time, resin is filled in the above-described slits.

And, a canned linear motor according to the seventh aspect of the invention is featured in that, in addition to the canned linear motor described in any one of the first through the six aspects of the invention, the above-described winding fixing frame is provided with slits extending in parallel to each other.

Further, a canned linear motor according to the eighth aspect of the invention is featured in that the canned linear motor includes field system yokes, having different polarities from each other, in which a plurality of permanent magnets are juxtaposed adjacent to each other; an armature disposed so as to be opposed to the above-described permanent magnet row with a magnetic gap secured therebetween and having an armature winding; in which the above-described armature is provided with a winding fixing frame having the above-described armature winding mounted on both sides thereof along the lengthwise direction of the above-described armature; a can that accommodates the above-described armature winding and the above-described winding fixing frame and has a coolant passage for causing a coolant to flow to the periphery of both the members; and a header having a coolant supply port attached at any one of the both ends of the above-described can and having a coolant discharge port attached at the other end thereof; and in which the above-described field system yokes are made into a stator and the above-described armature winding is made into a mover, and the above-described field system yokes and the above-described armature are caused to run relative to each other; wherein the entire length L of the above-described can is defined as follows:

$$L=(n+1/2)\lambda$$

where L is the entire length of the can, $\lambda$ is a polarity pitch of the permanent magnets, and an integer is n.

With the above-described construction, since the number of points where an eddy current occurs is made constant, and fluctuations of a viscous damping force are remarkably suppressed, it becomes possible to reduce fluctuations in the speed of a linear motor.

BEST MODE FOR CARRYING OUT THE INVENTION

[Embodiment 1]

Figure 1:
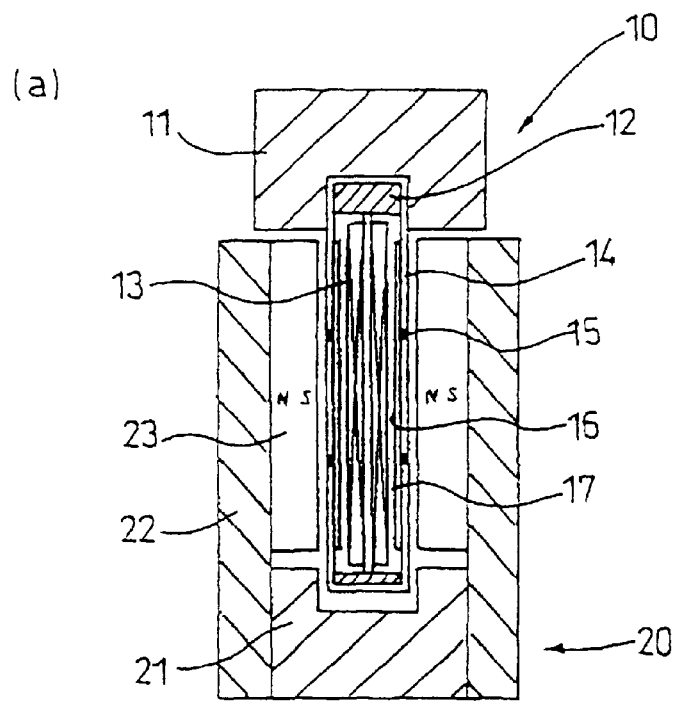
FIG. 1 is a cross-sectional view of a canned linear motor when being observed from the front side; wherein (a) shows a case of the invention, and (b) shows a case of the conventional art.
Figure 1:
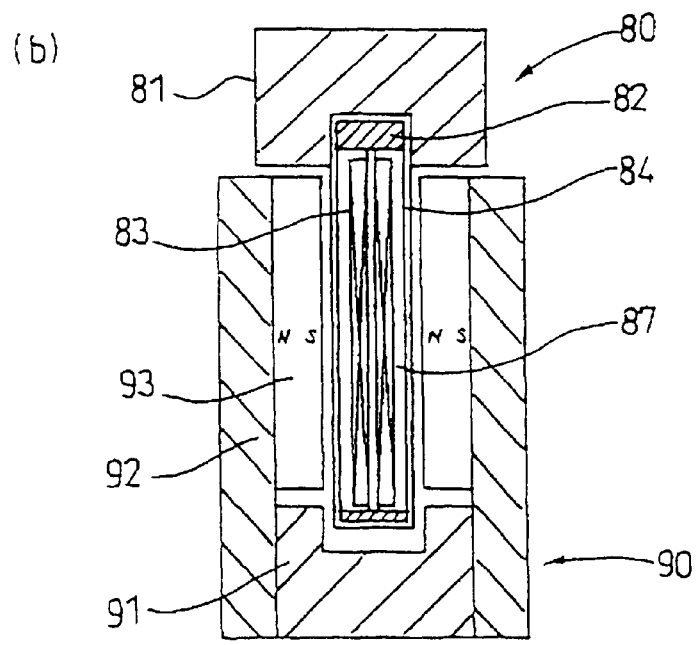
Figure 2:
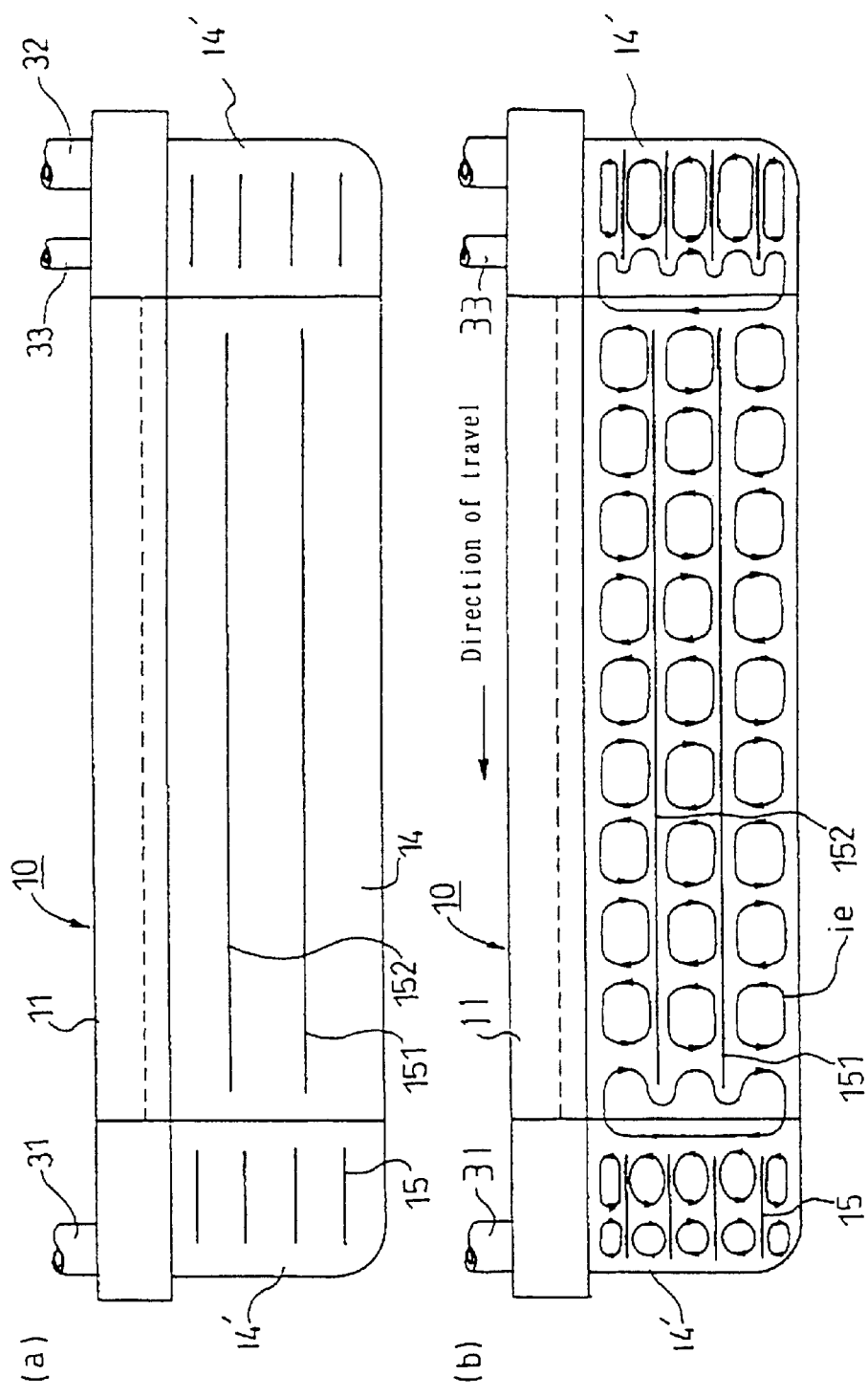
FIG. 2 shows a mover according to a first embodiment of the invention; wherein (a) is a side elevational view of a mover, and (b) is a view showing an occurrence of an eddy current at the side of the mover.
Figure 3:
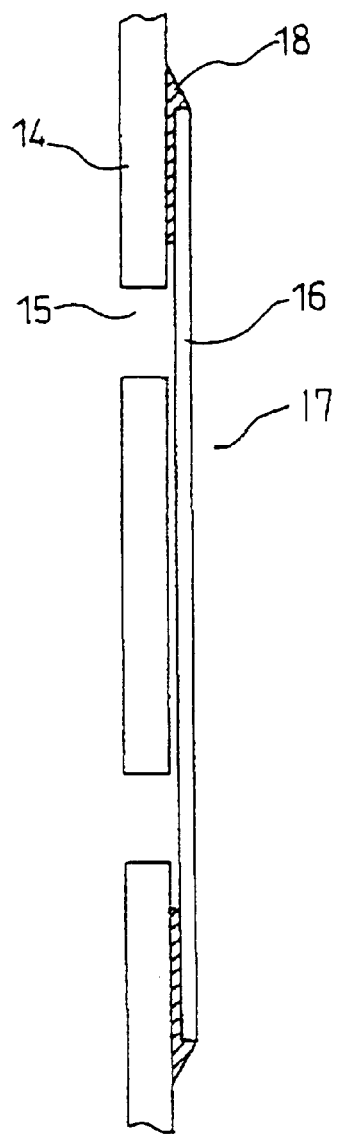
FIG. 3 shows a can according to the invention; wherein (a) is an enlarged view showing a cross section of the can according to the first embodiment, and (b) is an enlarged view showing a cross section of the can according to a third embodiment.
Figure 3:
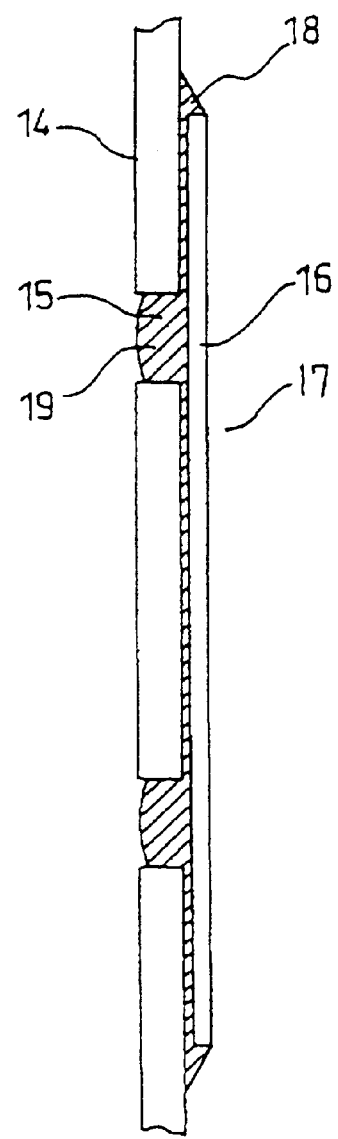

Hereinafter, a description is given of the first embodiment of the invention with reference to FIG. 1 through FIG. 3.

FIG. 1(a) is a cross-sectional view of a canned linear motor of the invention when being observed from the front side, FIG. 1(b) is a cross-sectional view of a canned linear motor of the conventional art when being observed from the front side. FIG. 2(a) is a side elevational view of a mover, and (b) is a view showing an occurrence of an eddy current at the side of the mover.

Figure 9:
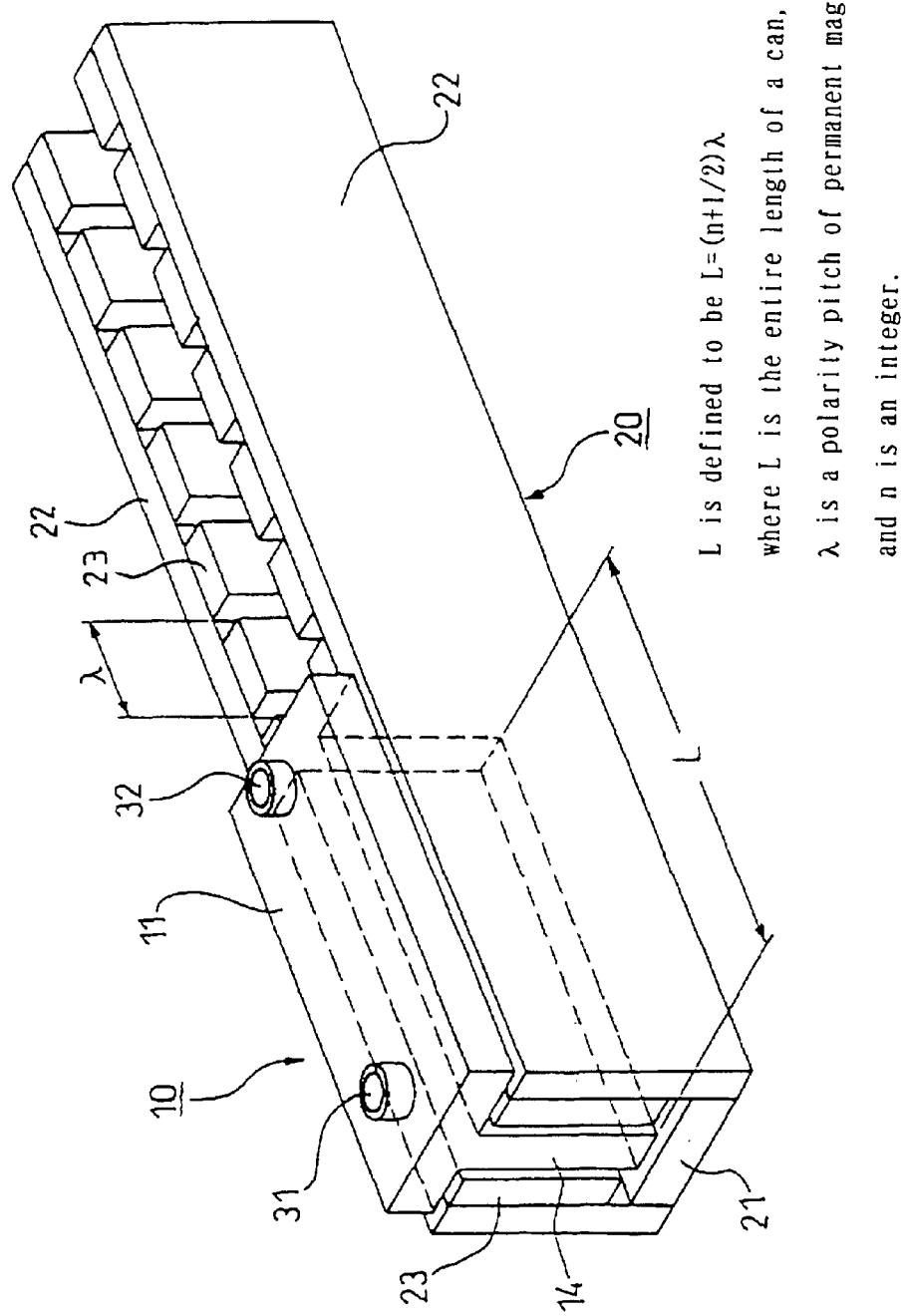
FIG. 9 is a perspective view showing the entire linear motor having a cooling can according to the third embodiment of the invention.

A stator 20 is recess-shaped so that the armature portion of a mover 10 is placed between the sides of the stator 20. The stator 20 is composed of field system yokes 22 made of a magnetic body and a stator base 21 to support the yokes 22, wherein the field system yokes permit a magnetic flux to pass therethrough, in which the magnetic flux is produced by a plurality of permanent magnets 23 disposed at both sides of a can 14 of the mover 10 and header 14' thereof with a magnetic gap. Also, a plurality of permanent magnets 23 juxtaposed in the direction of travel are disposed so that the permanent magnets 23 have a different polarity from each other at every polarity pitch λ (FIG. 9).

Figure 6:
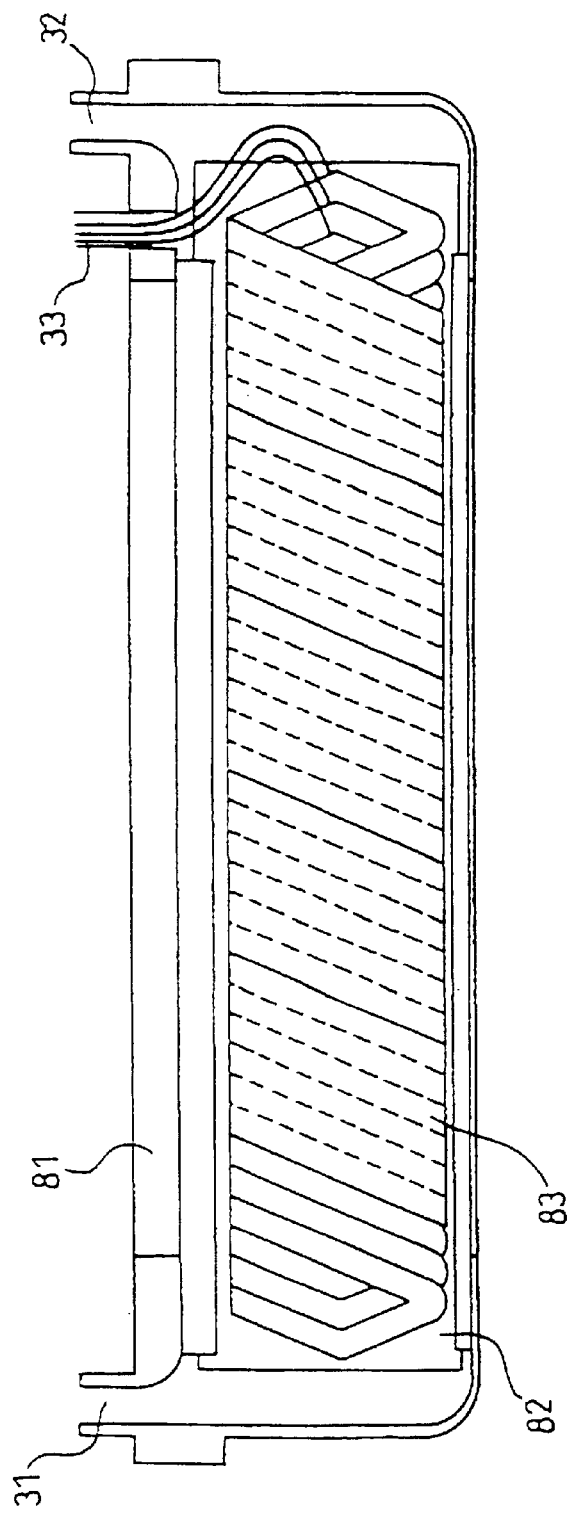
FIG. 6 is a view showing the interior of the mover when being observed from the side in the conventional art.

As in the conventional art, the mover 10 is T-shaped in FIG. 1(a). The mover 10 is composed of a three-phase thin plate type armature winding 13 (FIG. 6), a winding fixing frame 12, a coolant passage 17, a can 14 to cover these members, a header 14' (FIG. 2) to seal the can 14, and a mover base 11 to support the can 14.

By attaching the armature winding 13 to both right and left sides of the winding fixing frame 12, the strength of the entire armature winding is improved. Also, since strength is required at the winding fixing frame 12 itself, the winding fixing frame 12 is made of a stainless steel material.

The can 14 is produced by bending a thin stainless steel plate like a channel and welding it together so as to make it rectangularly tubular. Two headers 14' (FIG. 2) similarly formed of stainless steel casting are, respectively, provided with a coolant supply port 32 and a coolant discharge port 31 in order to permit a coolant to pass through. The can 14 and headers 14' are welded together at the conjunction plane thereof.

The mover 10 thus constructed is supported by a linear guide, an air slider, a sliding guide, etc., which are not illustrated, and is caused to move in the direction of travel.

In addition, by supplying a coolant through the coolant supply port 32 and discharging the same through the coolant discharge port 31, the coolant flows through a coolant passage 17 located between the armature winding 13 and the can 14, whereby since the coolant supplied through the coolant supply port 32 passes through the coolant passage 17 while capturing heat from the armature winding 13, and is discharged through the coolant discharge port 13, it is possible to suppress a temperature rise at the surface of the linear motor. The discharge coolant is cooled down by a cooling device (not illustrated) and re-circulated.

Points of difference from the conventional arts reside in that the can 14 is provided with a plurality of slits 151 and 152 extending in parallel to each other and in the direction of travel.

Also, the headers 14' are provided with more slits 15 extending in parallel to each other and in the direction of travel than the slits in the can 14.

Further, in order for the coolant not to leak through these slits 15, 151 and 152, a leak preventing sheet 16 (FIG. 3) is adhered to the can 14 with an adhesive agent 18 or adhesive agent 19 is filled in the slits. Also, the adhesive agent 18 and adhesive agent 19 may be the same material.

The slits 15 are holes that are cut open to be long and narrow in the direction of travel of the mover 10. The can 14 is provided with slits 151 and 152 that are divided into two stages in the height direction. Provision of a number of slits 151 and 152 in the can 14 made of a thin plate results in deterioration of the strength while lowering an eddy current ie. Since the headers 14' are provided with an end face and have allowance in strength, slits 15 are provided in four stages in the height direction.

In addition, as shown in FIG. 3(a), the leak preventing sheet 16 is adhered to two surfaces (in the drawing, only one surface is illustrated) facing the coolant passage 17 in the header tube of the can 14, so that the coolant flowing through the coolant passage 17 does not leak out of the slits 15.

Further, to prevent the mechanical strength from being lowered due to provision of the slits 15, as shown in FIG. 3(b), resin such as the adhesive agent 19 is filled in the slits 15, wherein even if a crack is produced in the leak preventing sheet 16, the coolant does not leak from the slits 15.

Figure 5:
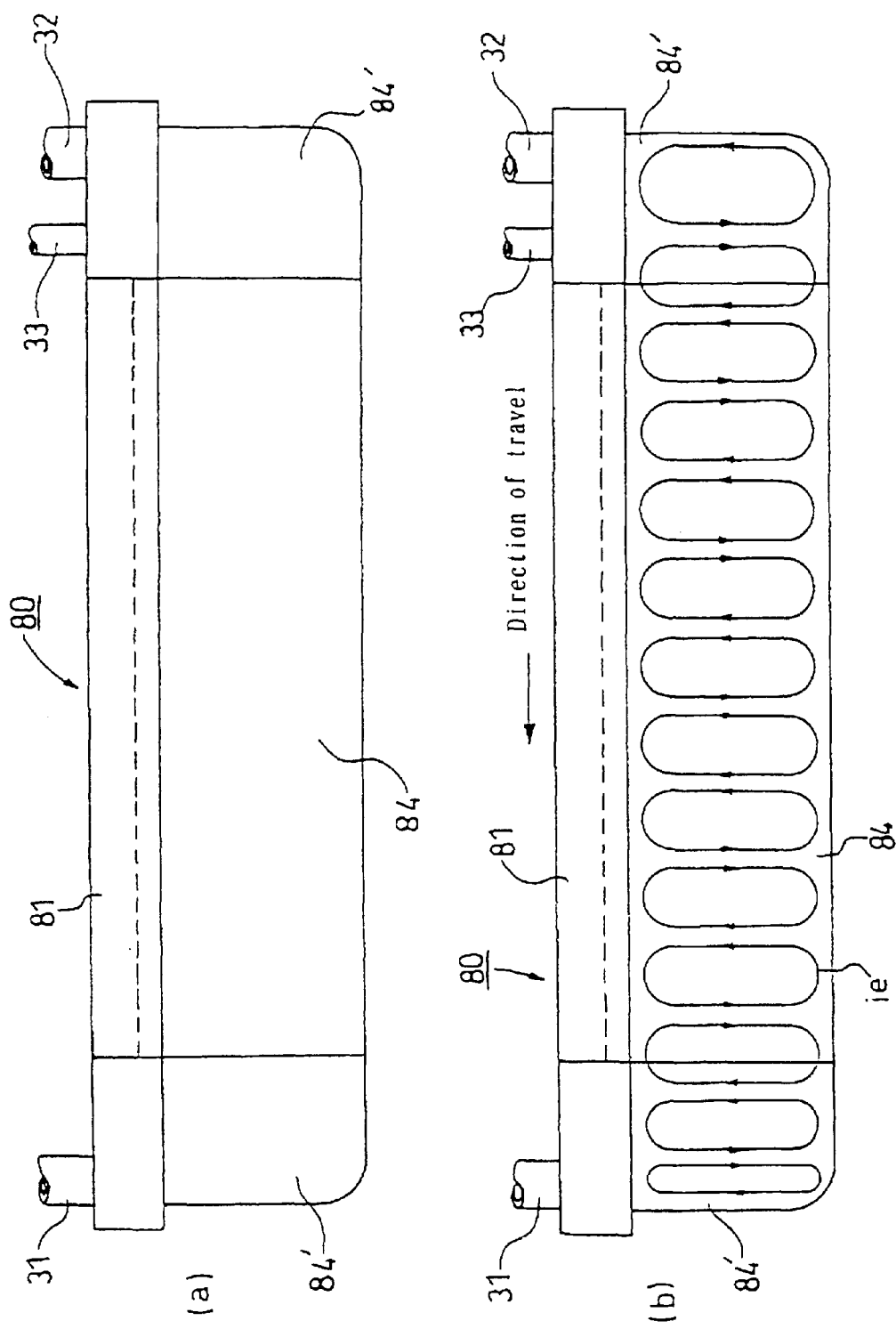
FIG. 5 shows a mover in a conventional art; wherein (a) is a side elevational view of the mover, and (b) is a view showing an occurrence of an eddy current at the side of the mover.

FIG. 2(b) shows how an eddy current ie occurs in the mover thus constructed. As has been made clear by comparing the above with FIG. 5(b) that is a view showing an occurrence of an eddy current in the conventional art, the eddy current ie produced by the invention is subdivided because the flow passage thereof is interrupted by the slits 151 and 152, whereby since vertical direction components of the eddy current ie are segmented, the viscous damping force can be made small.

Resultantly, since it is not necessary to generate a thrust for the viscous damping force, the copper loss is lowered, wherein it is possible to reduce a temperature rise of the mover. And, since the eddy current loss is decreased, it is possible to reduce heat of the can, header and winding fixing frame, which are locations where the eddy current loss is produced.

Figure 7:
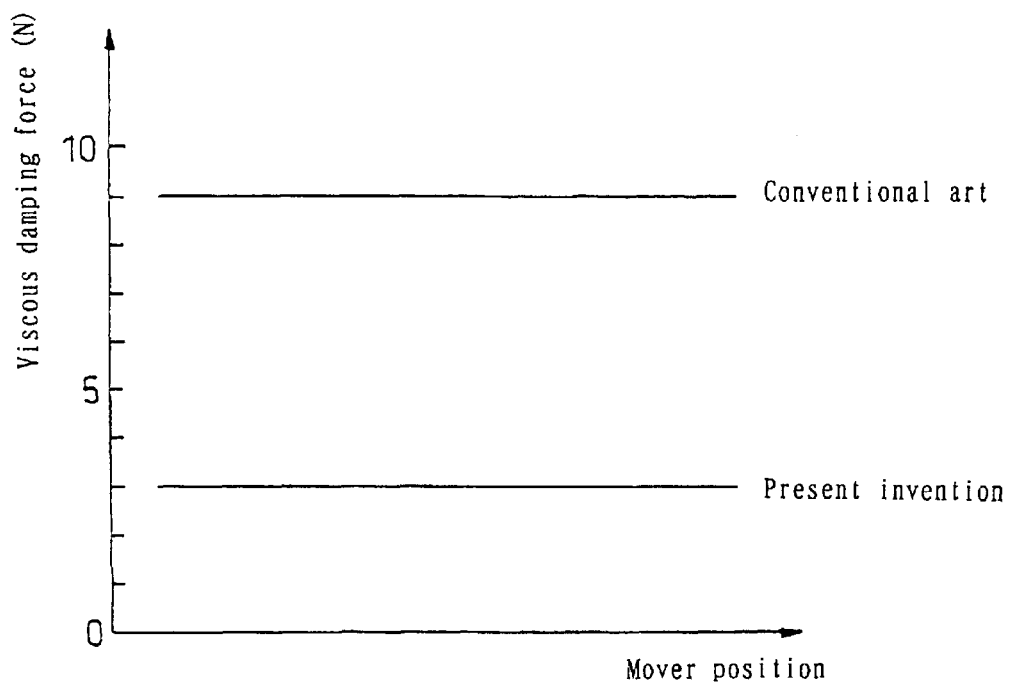
FIG. 7 is a view comparing a viscous damping force according to the first embodiment with that according to the conventional art.
Figure 8:
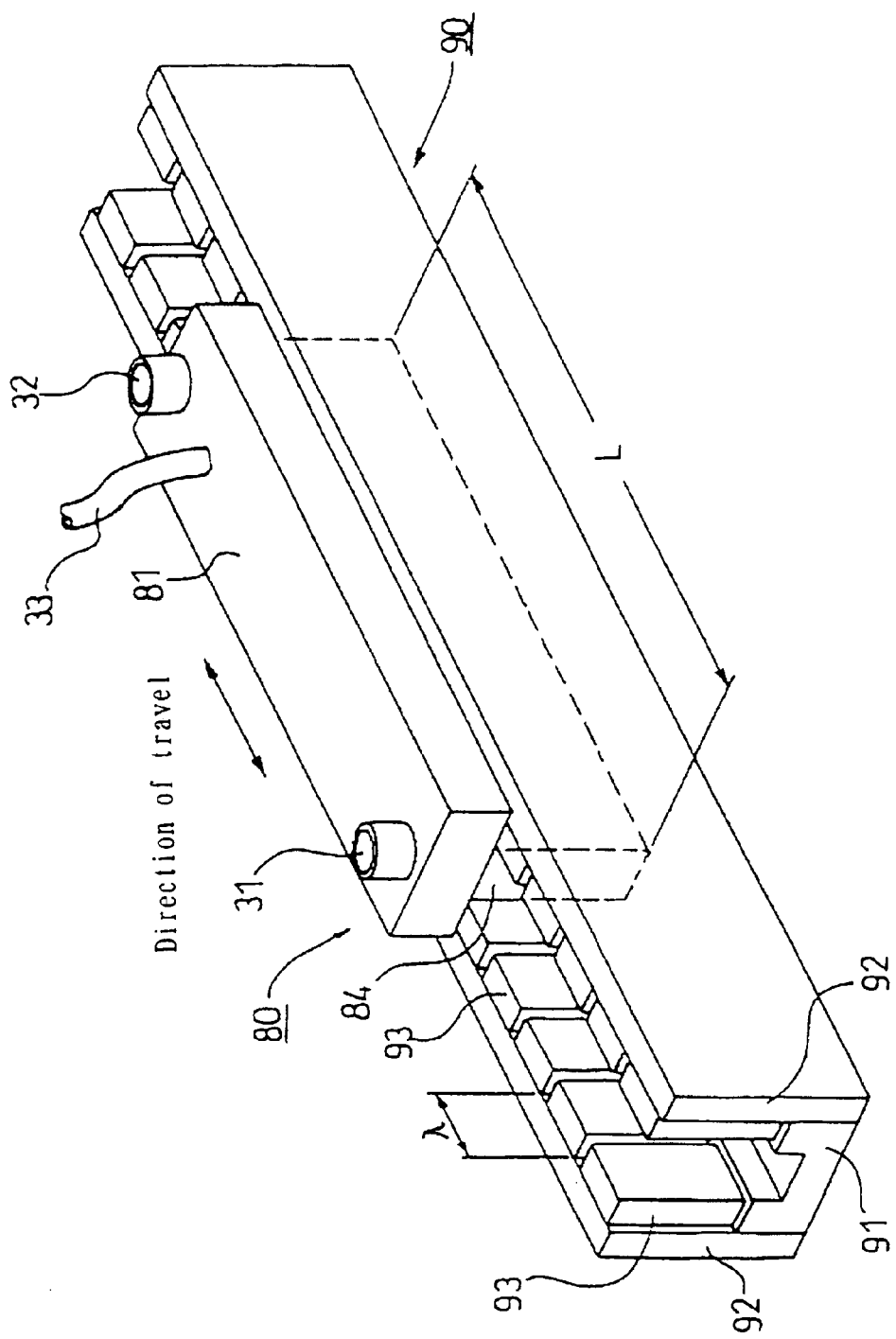
FIG. 8 is a perspective view of a canned linear motor according to the conventional art.

Next, FIG. 7 shows a comparison of a viscous damping force in the conventional art with that of the invention.

FIG. 7 shows the mover position—viscous damping force characteristics (unit: N) in a canned linear motor whose thrust is almost 400N (Newton) and speed is 0.2 m per second. According to the drawing, the viscous damping force according to the invention shifts around 3N while the viscous damping force according to the conventional art shifts around 9N, wherein the viscous damping force can be lowered to one-third in comparison with the conventional art.

The above-described embodiment was described, in which slits 15 are provided in only the can 14 and header 14'. A number of slits may be similarly provided in the winding fixing frame 12 (FIG. 1(*a*)).

Also, the above structure is such that the mover 10 is provided with the armature winding 13, and the stator 20 is provided with permanent magnets 23 which are field systems. An inverted structure is acceptable. Further, although the stator 20 is recess-shaped, such a structure, in which permanent magnets 23 are provided at only a single side, is acceptable.

[Embodiment 2]

Next, a description is given of the second embodiment of the invention.

Figure 4:
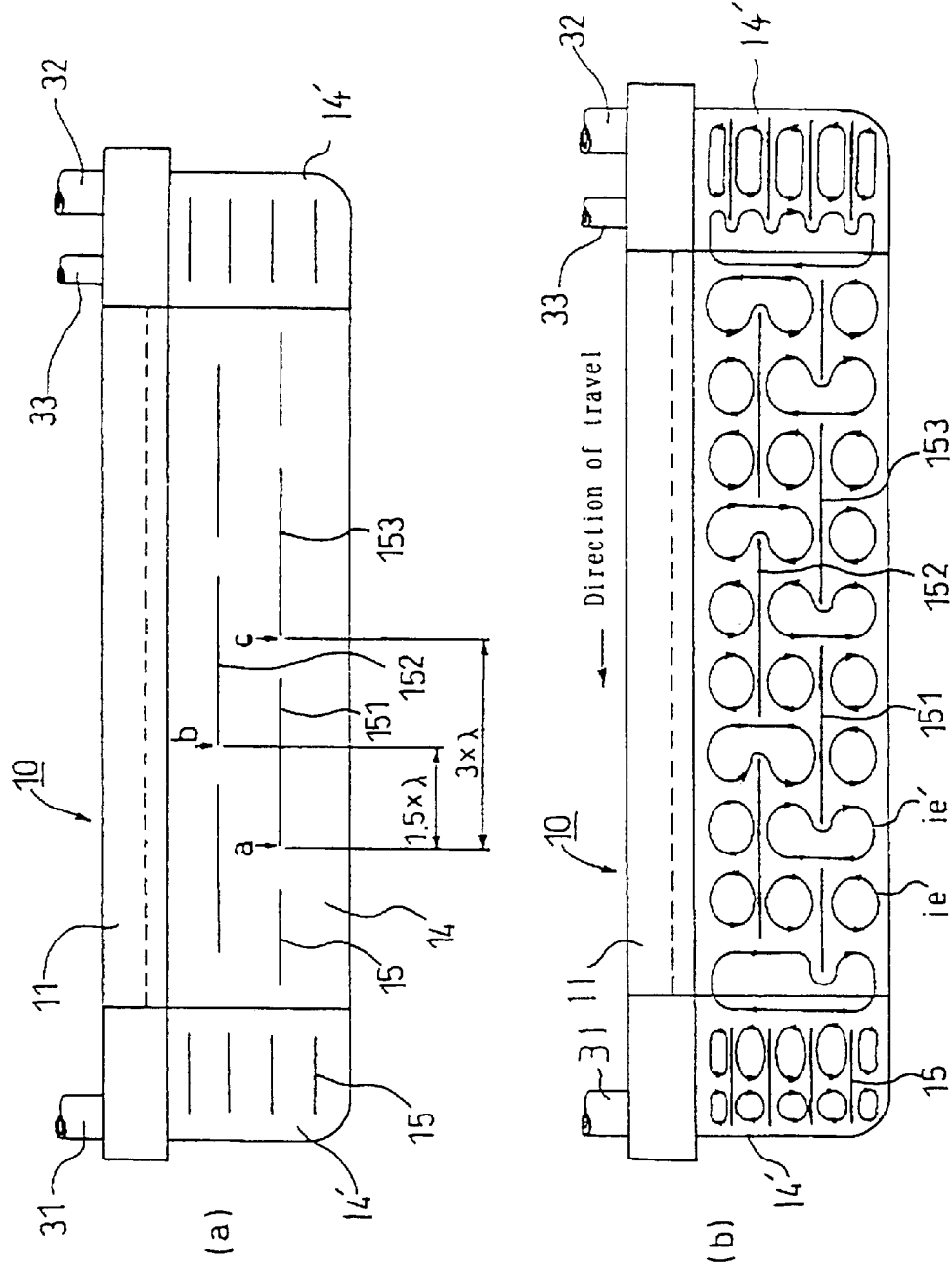
FIG. 4 shows a mover according to a second embodiment of the invention; wherein (a) is a side elevational view of a mover, and (b) is a view showing an occurrence of an eddy current at the side of the mover.

FIG. 4 shows a mover according to the second embodiment of the invention, wherein (*a*) is a side elevational view of the mover, and (*b*) is a view showing an occurrence of an eddy current at the side of the mover.

A point which is different from the first embodiment resides in the provision of slits. That is, as shown in FIG. 4(*a*), although slits extending in parallel to each other and in the direction of travel are continuous in the direction of travel in the first embodiment, the slits are discontinued here in the second embodiment. All other points are identical to those of the first embodiment.

In the same drawing, an interval between the end portion of the slit 151 and the corresponding end portion of the slit 153 is 3×λ where the polarity pitch of permanent magnets is λ as shown in FIG. 9, the entire length of the slits 151 and 153 is slightly shorter than 3×λ in the direction of travel, wherein differences are made into discontinuous portions. Also, a slip of 1.5×λ exists between those and the slits 152 adjacent thereto in the direction orthogonal to the direction of travel.

FIG. 4(*b*) shows how an eddy current ie occurs in the mover in which such slits are formed.

As has been made clear in the same drawing, since the flow passage is interrupted by the slits 151, 152 and 153, the eddy current ie is subdivided, wherein since the vertical direction components of the eddy current ie are also segmented, the viscous damping force is remarkably reduced in comparison with the conventional art.

However, since eddy current ie', which is slightly longer in the vertical direction than the eddy current ie, is produced in the discontinuous portions of the slits, wherein if the second embodiment is compared with the first embodiment with respect to only the eddy current ie, the former is slightly inferior to the latter in a lowering of the viscous damping force. However, the mechanical strength of the former can be remarkably increased by the discontinuous portions, and totally, the second embodiment overcomes the first embodiment.

All other points are the same as those of the first embodiment. That is, slits may be provided at the headers 14' and winding fixing frame 12 (FIG. 1(*a*)), a leak preventing sheet 16 or a thin plate of an insulating material may be adhered to the inside of the can 14 and header 14', and adhesive agent 19 is filled in the slits 15. All of these are the same as those in the first embodiment.

Although, in the above description, the side in which permanent magnets are provided is made into a stator, and the side in which the above-described armature winding is provided is made into a mover, it is needless to say that the invention can be realized if, on the contrary, the side where the permanent magnets are provided is made into the mover, and the side where the armature winding is provided is made into the stator.

[Embodiment 3]

Next, a description is given of the third embodiment of the invention with reference to FIG. 9 through FIG. 12.

FIG. 9 is a perspective view of the entire linear motor having a cooling can according to the third embodiment of the invention. In the third embodiment, the entire length of the can 14 of the mover 10 is defined as in Expression (1);

$$L=(n+1/2)\lambda \quad (1)$$

where n is an integer, and λ is a polarity pitch of the permanent magnets.

Except for the above definition, the third embodiment is identical to the conventional device in terms of structure, wherein an overlapping description is omitted. Also, the stator 20 is not changed from the conventional device with respect to the shape and structure.

Figure 10:
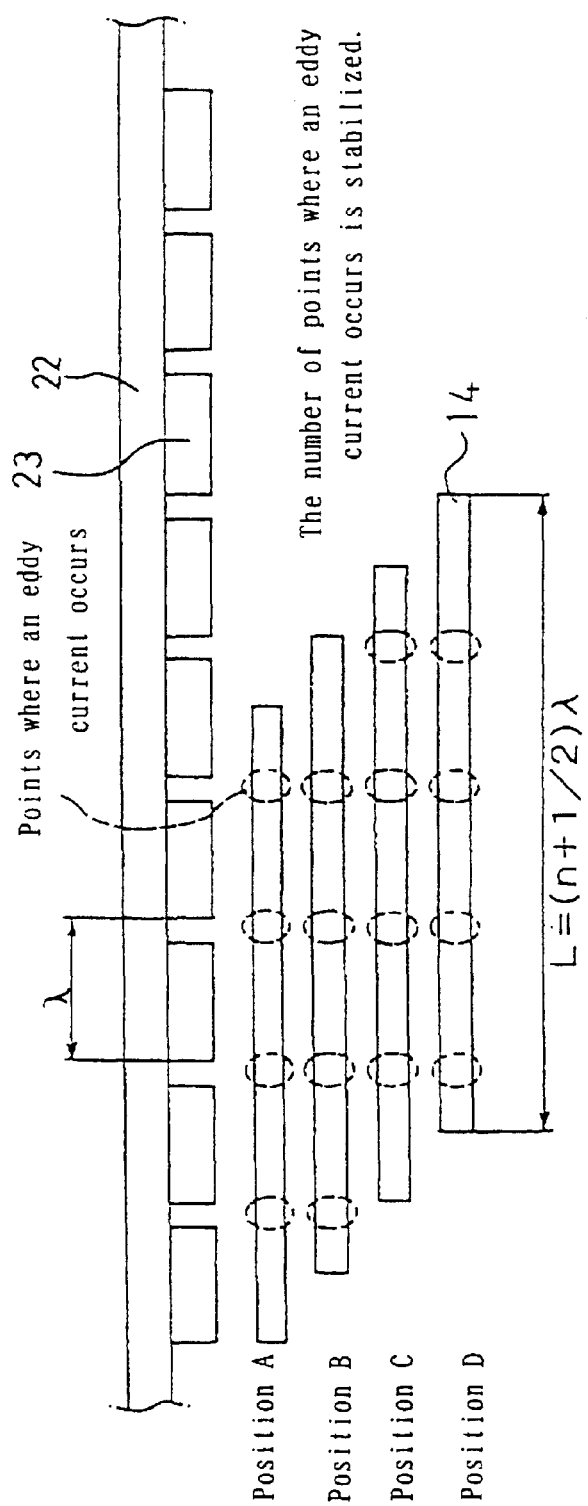
FIG. 10 is a sketch describing the condition of points where an eddy current occurs, according to the invention.

FIG. 10 is an exemplary view showing the condition where a linear motor according to the third embodiment is observed from above (the mover side) and is a sketch showing the condition of the points (circles indicated by a broken line) where an eddy current occurs, according to the positions (A, B, C and D) of the mover can 14.

In the same drawing, it is understood that the points where an eddy current occurs are four at the position A of the mover can 14. As in the above, there are four points where an eddy current occurs, at the position B of the mover can 14. Further, it is understood that there four points where an eddy current occurs, at positions C and D of the mover can 14. That is, since the entire length L of the mover can 14 is defined as in Expression (1), points where an eddy current occurs are stabilized to be four at any position of the mover can 14. The longer the entire length L of the can becomes, the greater the increase in the number of points where an eddy current occurs. However, the number of the points does not fluctuate.

Figure 11:
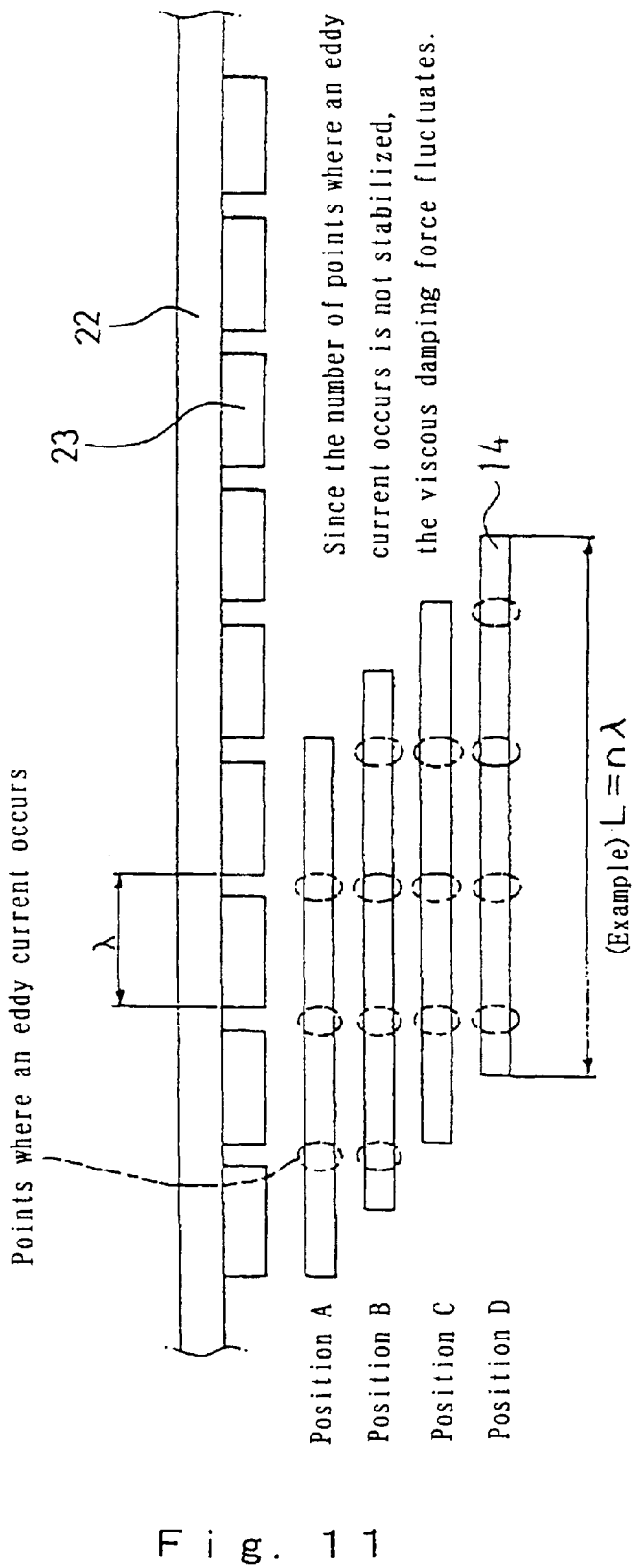
FIG. 11 is a sketch describing the condition of points where an eddy current occurs, according to the conventional art.

On the other hand, FIG. 11 is an exemplary view showing the condition where an eddy current occurs, at the position of the mover in the conventional art linear motor. FIG. 11 shows a case where the entire length L of the mover can 14 is established to be L=nλ. In the same drawing, although there are three points where an eddy current occurs at the position A of the mover can 14, there are four points at the position B, and there are three points at the position C again. Also, there are four points at the position D again. That is, since the entire length L of the mover can 14 is established to be L=nλ, the number of points where an eddy current occurs fluctuates according to the positions where the mover can 14 is placed.

Figure 12:
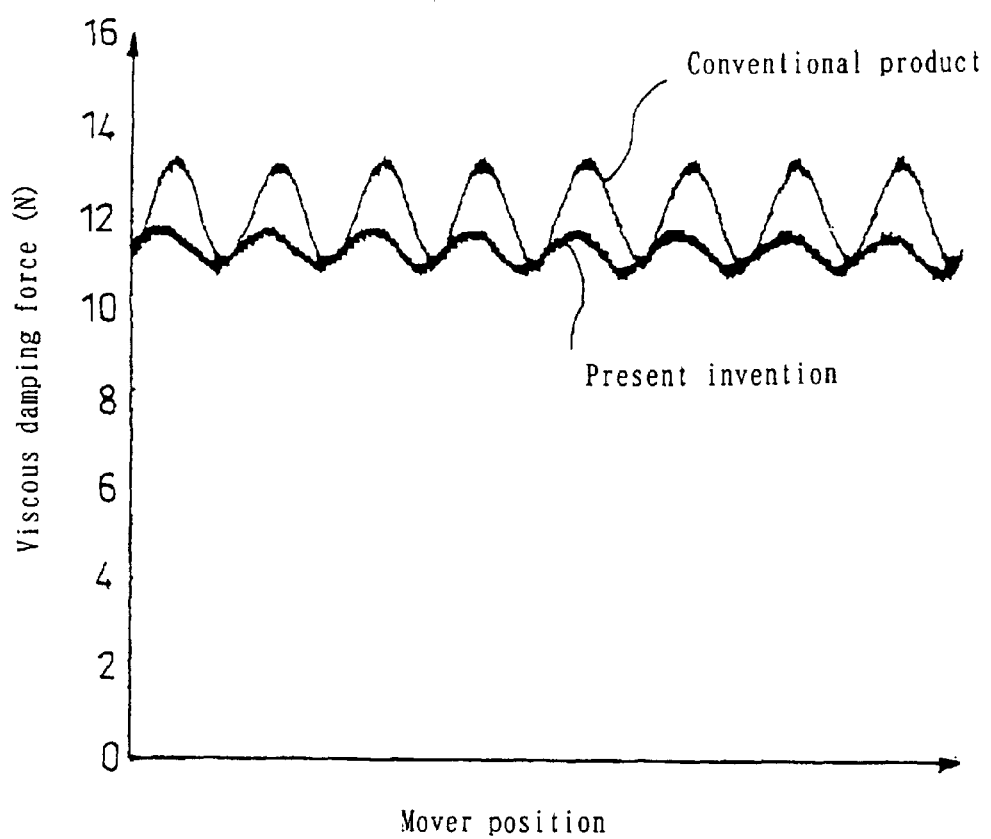
FIG. 12 is a view comparing a viscous damping force the according to the third embodiment of the invention with that of the conventional art.

Next, FIG. 12 shows a comparison between fluctuations in the viscous damping force according to the conventional art and those according to the invention.

FIG. 12 shows fluctuations in the viscous damping force when the speed is 0.2 m per second in a linear motor whose rated thrust is approx. 450N. The conventional product is a linear motor, produced by our company (YASKAWA ELECTRIC), for which the entire length of the mover can is almost integral multiple with the pitch of the permanent magnets. In the same drawing, in the case of the conventional product, the minimum value of the viscous damping force is roughly 11N, and the maximum value thereof is roughly 13N, wherein it is understood that the fluctuation is 2N. On the other hand, in the case of the invention, the minimum value of the viscous damping force is roughly 11N, and the maximum value thereof is roughly 12N, wherein the fluctuation is 1N. Therefore, according to the invention, the fluctuation of the viscous damping force is reduced from 2N to 1N, and is lowered to approx. one-second.

In addition, in a movable magnet type linear motor in which the mover is set at the field system side, since the can is always provided in a magnetic flux, and the amount of occurrence of an eddy current does not fluctuate, no fluctuation in the viscous damping force occurs. Therefore, no influence is applied to the invention.

[Industrial Applicability]

The invention is applied to a linear motor that is used for a transfer system of factory automation apparatus, for example, table feeding of a machine tool, and in particular, the invention is useful in the field of providing linear motors which can reduce the viscous damping force, and to lower a fluctuation in speed without lowering the mechanical strength characteristics.

What is claimed is:

1. A canned linear motor including: field system yokes, having different polarities from each other, in which a plurality of permanent magnets are juxtaposed adjacent to each other; an armature disposed so as to be opposed to said permanent magnet row with a magnetic gap secured therebetween and having an armature winding; in which said armature is provided with a winding fixing frame having said armature winding mounted on both surfaces thereof along the lengthwise direction of said armature; a can that accommodates said armature winding and said winding fixing frame and has a coolant passage for causing a coolant to flow to the surrounding of both the members; and a header having a coolant supply port attached at one of both ends of said can and having a coolant discharge port attached at the other end thereof; and in which any one of said field system yokes and said armature are made into a stator, and the other of which is made into a mover, and said field system yokes and said armature are caused to run relative to each other; wherein a plurality of slits are provided in said can, a leak preventing sheet is adhered to the inside of said can so as to cover said slits; and at the same time, resin is filled in said slits.

2. The canned linear motor according to claim 1, wherein said plurality of slits extend in the direction of travel in parallel to each other.

3. The canned linear motor according to claim 1, wherein said plurality of slits are split in parallel to each other and in the direction of travel.

4. The canned linear motor according to claim 1, wherein said plurality of slits are disposed one by one every 3×λ.(λ= polarity pitch).

5. The canned linear motor according to claim 1, wherein said plurality of slits are split in parallel to each other and in the direction of travel, and a slit of 1.5λ.(λ=polarity pitch) is provided between said sifts and adjacent slits iii the direction orthogonal to the direction of travel.

6. The canned linear motor according to claim 1, said header is provided with a plurality of slits extending in parallel to tacit otter in the travel direction, and a leak preventing sheet is adhered to the inside of said header so as to cover said slit, and attic same time, resin is filled in said stilt.

7. The canned linear motor according to claim 1, wherein said winding fixing frame is provided with slits extending in parallel to each other.

8. A canned linear motor includes field system yokes, having different polarities from each other, in which a plurality of permanent magnets are juxtaposed adjacent to each other; an armature disposed so as to be opposed to said permanent magnet row with a magnetic gap secured therebetween and having an armature winding; in which said armature is provided with a winding fixing triune having said armature winding mounted on both surfaces thereof along the lengthwise direction of said armature; a can that accommodates said armature winding and said winding fixing frame and has a coolant passage for causing a coolant to flow to the periphery of both the members; and a heater having a coolant supply port attached at any one of both eats of salt can and bring a coolant discharge port attached at the other end thereof; and in which said field system yokes are made into a stator and said armature winding is made into a mover, and said field system yokes and said armature are caused to run relative to each other; wherein the entire length L of said can is defined as follow:

$$L = (n+1/2)\lambda$$

where L is the entire length of the can, λ is a polarity pitch at the permanent magnets, and an integer is n.

* * * * *